(12) United States Patent
Yamada et al.

(10) Patent No.: US 10,640,053 B2
(45) Date of Patent: May 5, 2020

(54) DISPLAY HOLDER

(71) Applicant: Toyota Jidosha Kabushiki Kaisha, Toyota-shi, Aichi-ken (JP)

(72) Inventors: Takako Yamada, Nagoya (JP); Yasuhisa Fujiwara, Miyoshi (JP); Kuniaki Hasegawa, Kariya (JP); Yoshinari Maeda, Tajimi (JP); Yukinori Kawamura, Tajimi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/262,042

(22) Filed: Jan. 30, 2019

(65) Prior Publication Data
US 2019/0232885 A1 Aug. 1, 2019

(30) Foreign Application Priority Data
Feb. 1, 2018 (JP) .................. 2018-016779

(51) Int. Cl.
*B60R 11/02* (2006.01)
*B60R 11/00* (2006.01)

(52) U.S. Cl.
CPC .......... *B60R 11/0235* (2013.01); *B60R 11/02* (2013.01); *B60R 11/0241* (2013.01); *B60R 11/0252* (2013.01); *B60R 2011/0003* (2013.01); *B60R 2011/0071* (2013.01); *B60R 2011/0082* (2013.01)

(58) Field of Classification Search
CPC ....... B60R 2011/027; B60R 2011/0005; B60R 2011/0294; B60R 2011/0082; B60R 11/02; B60R 11/0235; B60R 11/0229; B60R 11/0241; B60R 11/0258; Y10S 224/929

USPC ............... 248/27.1; 296/37.12; 224/483, 929
See application file for complete search history.

(56) References Cited

U.S. PATENT DOCUMENTS

| | | | | |
|---|---|---|---|---|
| 8,646,393 | B2 * | 2/2014 | Souillac | B60R 11/00 108/45 |
| 8,708,296 | B2 * | 4/2014 | Nemoto | B60R 11/02 248/316.4 |
| 9,014,393 | B2 * | 4/2015 | Huh | B60R 11/02 381/386 |
| 10,391,950 | B2 * | 8/2019 | Vander Sluis | B60R 11/02 |
| 2015/0343962 | A1 * | 12/2015 | Le Leizour | B60R 11/02 361/809 |
| 2018/0345874 | A1 * | 12/2018 | Thain | B60R 11/0241 |

FOREIGN PATENT DOCUMENTS

JP 2016-500353 A 1/2016

* cited by examiner

*Primary Examiner* — Scott T McNurlen
(74) *Attorney, Agent, or Firm* — Dinsmore & Shohl LLP

(57) ABSTRACT

A display holder includes a display mounting stand that includes a pair of upper and lower holding parts configured to hold a display in a stand-up posture therebetween. Each of the holding parts has a cut-out in a portion of the holding part. An accommodating part includes an aperture through which the display mounting stand passes, and which is filled with one of the holding parts when the display mounting stand is accommodated. A portion of the aperture includes a projection projecting inward of the aperture. The projection located at a position through which the cut-outs pass while the display mounting stand is in the laid-down posture. The projection fills the cut-out of one of the holding parts when the display mounting stand is accommodated.

5 Claims, 2 Drawing Sheets

DISPLAY HOLDER

CROSS-REFERENCE TO RELATED APPLICATIONS this application claims priority to Japanese Patent Application No. 2018-016779 filed on Feb. 1, 2018, which is incorporated herein by reference in its entirety including the specification, drawings and abstract.

BACKGROUND

1. Technical Field

The present disclosure relates to a display holder accommodated in an instrument panel of a vehicle.

2. Description of Related Art

A display holder including a display mounting stand is known. A display, such as a smartphone and a tablet computer, can be placed on the display mounting stand. The display mounting stand is configured to be accommodated in an instrument panel in a laid-down posture or pulled out from the instrument panel. The display mounting stand is pulled out and then pulled up to hold the display in a stand-up posture (see Published Japanese Translation of PCT Application No. 2016-500353, for example).

SUMMARY

The above display includes a secondary battery as a power source for driving. Further securing an external power source for driving makes it feasible to drive the display without relying on the secondary battery. For this purpose, the above display holder is desired to be provided with a configuration to enable a connection between the display in a held state and the external power source. The present disclosure provides a display holder that enables a connection between a display in a held slate and an external power source.

An aspect of the present disclosure is a display holder including a display mounting stand configured to be accommodatable in an accommodating part located to an instrument panel of a vehicle. The display mounting stand is configured to be accommodated in a laid-down posture in the accommodating part, and be pulled out from the accommodating part to hold a display in a stand-up posture. The display mounting stand includes a pair of holding parts configured to hold the display in the stand-up posture between the pair of holding parts. The pair of holding parts is a pair of upper and lower holding parts. Each of the pair of holding parts has a cut-out in a portion of the holding part, the portion of the holding part facing an edge of the display. The accommodating part includes an aperture through which the display mounting stand in the laid-down posture passes, and the aperture is filled with one holding part of the pair of holding parts when the display mounting stand is accommodated in the accommodating part. A portion of the accommodating part includes a projection projecting inward of the aperture, the portion of the accommodating part defining the aperture. The projection located at a position through which the cut-outs pass while the display mounting stand is in the laid-down posture. The projection has a shape filling the cut-out of the one holding part when the display mounting stand is accommodated in the accommodating part.

According to the above configuration, the pair of upper and lower holding parts holds the display therebetween in an up-down direction, and the display holder thereby holds the display in the stand-up posture. At this time, at least one of the holding parts enables a connection via a cable between the display and an external power source through the cut-outs. Hence, it is possible to supply electric power from the external power source to the display in a held state. When the display mounting stand is accommodated in the accommodating part, the aperture of the accommodating part is filled with one of the holding parts. The cut-out included in one of the holding parts is filled with the projection of the aperture. As a result, when the display mounting stand is accommodated in the accommodating part, it is possible to avoid that the aperture is kept opened.

In the above display holder, the display holder may further include a support part rotatably connected to a back surface of the display mounting stand. The back surface of the display mounting stand may be a surface of the display mounting stand in the stand-up posture facing the aperture. The support part may be configured to be in a posture along the back surface when the display mounting stand is in the laid-down posture. The support part may be configured to be in a posture inclined relative to the back surface when the display mounting stand is in the stand-up posture. The support part may include an abutting portion brought to abut to the projection by push-in of the display mounting stand in the stand-up posture toward the aperture. The abutting portion may be configured to restrict rotation of the support part by abutment to the projection, and abut to the projection in a surface contact.

According to the above configuration, since the display mounting stand in the stand-up posture is supported by the support part, stability of the stand-up posture can be enhanced. At this time, the posture of the support part is maintained by the abutment between the projection of the aperture and the support part. The abutment between the support part and the projection is implemented by a surface contact. As a result, even when the abutment between the support part and the projection is repetitively made several times, contact marks can be suppressed from remaining thereon. That is, in the display holder having the projection that can be visually recognized, the design property of the display holder can be preserved.

In the above display holder, in the display mounting stand in the stand-up posture, the cut-outs may open in a direction where the display mounting stand is pulled out. According to the above configuration, the cut-outs open in the direction where the display mounting stand is pulled out. That is, in the display mounting stand in the stand-up posture, the cut-outs open toward the user. Accordingly, when the user connects the cable to the display, workability for the user can be enhanced.

In the above display holder, each of the pair of holding parts may further include a pair of holding hooks configured to hold the display. The pair of holding hooks may be a pair of right and left holding hooks. In the display mounting stand in the stand-up posture, the pair of holding hooks may extend in the up-down direction, and be arranged on a right side and a left side of an opening of the cut-out with the opening of the cut-out interposed between the holding hooks.

According to the above configuration, in the display mounting stand in the stand-up posture, the cut-outs and gaps between the pair of holding hooks both open toward the user. Accordingly, workability for the user can further be enhanced, and stability of the posture of the display in the held state can also be enhanced.

In the above display holder, when the display mounting stand is accommodated in the accommodating part, outer shapes of the cut-outs and an outer shape of the projection may coincide with each other when seen from a direction opposite to the aperture.

According to the above configuration, since the outer shapes of the cut-outs and the outer shape of the projection coincide with each other, in the display holder having the projection that can be visually recognized, the design property of the display holder can further be enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
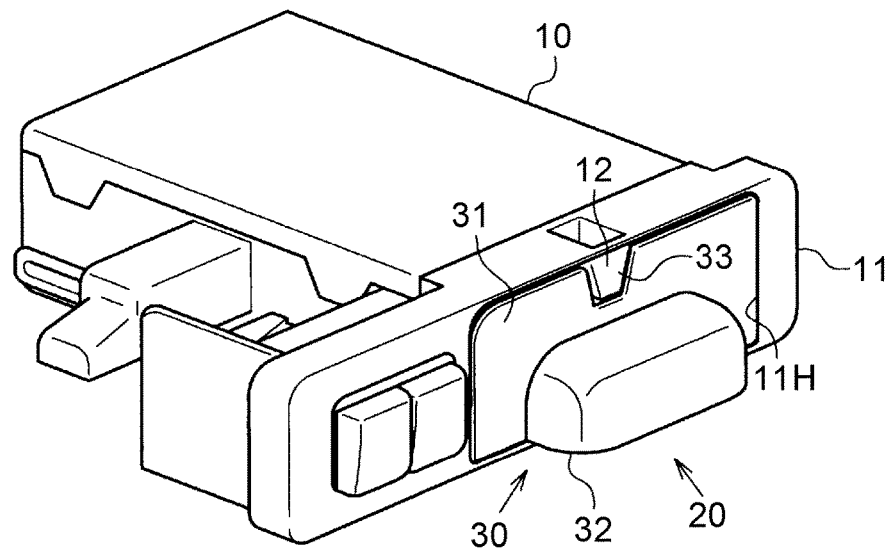
FIG. 1 is a view showing a structure in perspective view of a display holder of one embodiment, the display holder in an accommodated state.
Figure 2:
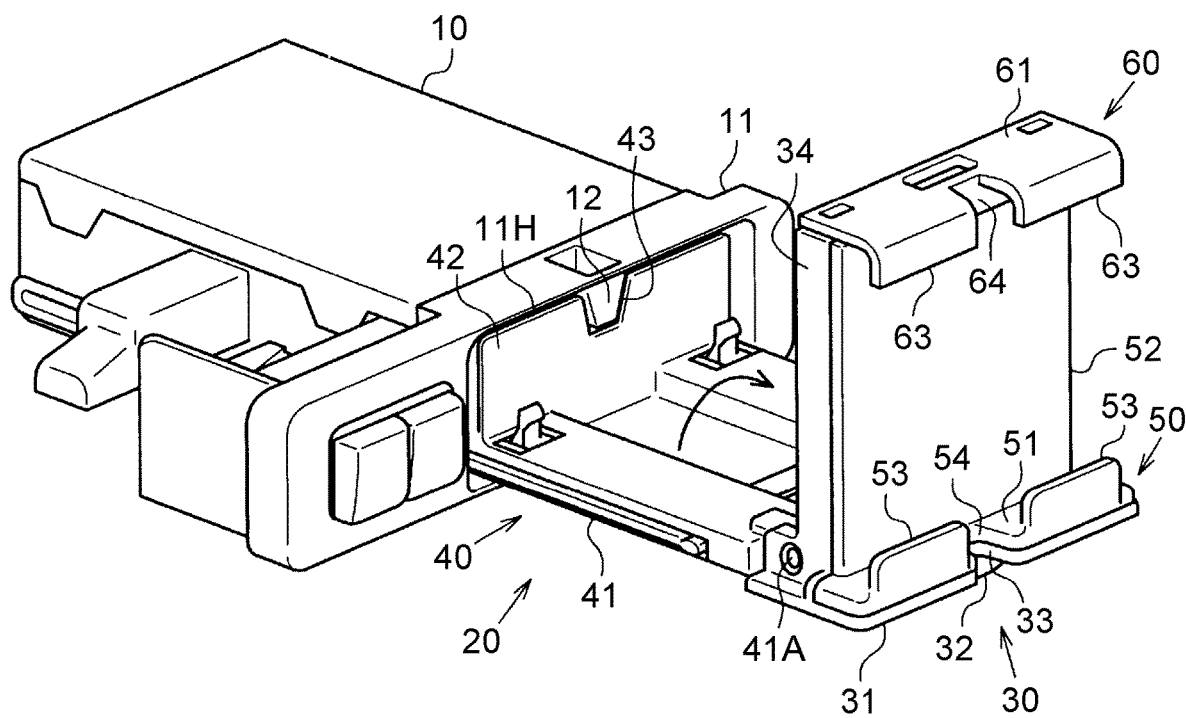
FIG. 2 is a view showing the structure in perspective view of the display holder in a pulled-out state.
Figure 3:
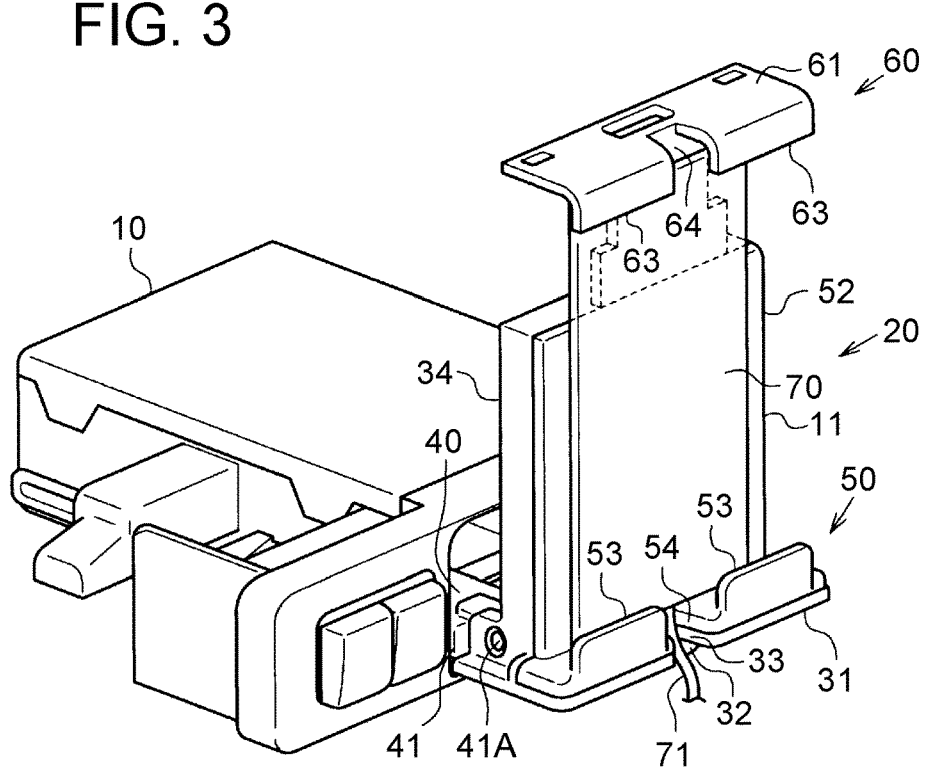
FIG. 3 is a view showing the structure in perspective view of the display holder in a state of holding a display.

Hereinafter, one embodiment of a display holder will be described with reference to FIG. 1 to FIG. 4. FIG. 1 shows a state in which a display mounting stand is accommodated in an accommodating part. FIG. 2 shows a state in which the display mounting stand is pulled out from the accommodating part, and is displaced from a laid-down posture to a stand-up posture. FIG. 3 shows a slate in which a display is placed on the display mounting stand in a stand-up posture.

As shown in FIG. 1, the display holder includes the accommodating part 10 and the display mounting stand 20. The accommodating part 10 has a box-like shape and is fixed to an instrument panel of the vehicle. The accommodating part 10 includes an aperture 11 having a pull-out port 11H in a quadrangular shape facing a vehicle cabin. The aperture 11 includes a projection 12 downwardly extending inward of the pull-out port 11H. The projection 12 has a reverse frustum shape, the bottom of which is an edge of the pull-out port 11H. The accommodating part 10 accommodates the display mounting stand 20.

The display mounting stand 20 includes an operating part 30. The operating part 30 includes a closing wall 31 and a handle 32. The closing wall 31 configures a front surface of the display mounting stand 20 accommodated in the accommodating part 10. The operating part 30 includes a cut-out 33. The cut-out 33 is located on a periphery of the closing wall 31, and the cut-out 33 opens toward an upper edge of the aperture 11. An outer shape of the cut-out 33 coincides with an outer shape of the projection 12 when seen from a direction opposite to the pull-out port 11H. The cut-out 33 is filled with the projection 12, and the entire pull-out port 11H is filled with the closing wall 31. That is, the projection 12 is filled (i.e. fitted) into the cut-out 33, and the closing wall 31 is filled (i.e. fitted) into the entire pull-out port 11H.

The structure in which the entire aperture 11 is filled with the closing wall 31 forms a continuous surface shape by the aperture 11 and the operating part 30. The structure in which the entire aperture 11 is filled with the closing wall 31 suppresses entry of foreign matters into the accommodating part 10.

The handle 32 has a half-bowl shape opening downward, and is designed to allow a finger or the like to be inserted in the handle from below. The handle 32 is used when the display mounting stand 20 is pulled out from the accommodating part 10, when the display mounting stand 20 is displaced from the laid-down posture to the stand-up posture, and when the display mounting stand 20 is pushed into the accommodating part 10.

As shown in FIG. 2, the display holder includes a translation base 40. The display mounting stand 20 includes the operating part 30, a lower holding part 50, and an upper holding part 60.

The translation base 40 includes a translation plate 41 and a closing wall 42. The translation plate 41 has a rectangular shape to be accommodated in the accommodating part 10, and has a dimension small enough to pass through the pull-out port 11H of the aperture 11. The translation plate 41 allows pull-out of the display mounting stand 20 from the accommodating part 10 toward inside of the vehicle cabin, and push-in of the display mounting stand 20 from inside of the vehicle cabin toward the accommodating part 10. The translation plate 41 includes a rotating shaft 41A at the end on the vehicle cabin side. The display mounting stand 20 is coupled to the rotating shaft 41A of the translation plate 41 in such a manner as to turn between the posture in which the display mounting stand 20 is laid down along the translation plate 41 (laid-down posture) and the posture in which the display mounting stand 20 stands up (stand-up posture). The display mounting stand 20 is accommodated in the laid-down posture together with the translation plate 41 in the accommodating part 10. The display mounting stand 20 is pulled out in the laid-down posture from the accommodating part 10, and is pushed into the accommodating part 10 also in the laid-down posture. The display mounting stand 20 is pulled out in the laid-down posture together with the translation plate 41 from the accommodating part 10, and is then turned in an arrow direction in the drawing and is then displaced to the stand-up posture.

The translation base 40 includes the closing wall 42 at the end on the accommodating part 10 side. The closing wall 42 configures a back surface of the translation base 40 being pulled out from the accommodating part 10. The closing wall 42 includes a cut-out 43. The cut-out 43 is located on a periphery of the closing wall 42, and opens toward the upper edge of the aperture 11. An outer shape of the cut-out 43 coincides with an outer shape of the projection 12 when seen from the direction opposite to the pull-out port 11H. The cut-out 43 is filled by the projection 12, and the entire pull-out port 11H is filled by the closing wall 42. The structure in which the entire aperture 11 is filled with the closing wall 42 suppresses entry of foreign matters into the accommodating part 10 in the pull-out state of the translation base 40.

The display mounting stand 20 includes the operating part 30, the lower holding part 50, and the upper holding part 60. The display mounting stand 20 includes a pair of upper and lower holding parts used for holding the display. The operating part 30 and the lower holding part 50 configure one of the holding parts. The upper holding part 60 configures the other of the holding parts.

The operating part 30 includes a back surface wall 34 extending upward from the closing wall 31, in the display mounting stand 20 in the stand-up posture. In the display mounting stand 20 in the stand-up posture, the back surface wall 34 configures a surface facing the aperture 11, that is, a back surface of the display mounting stand 20. In the display mounting stand 20 in the laid-down posture, a back surface of the back surface wall 34 faces an upper surface of the translation plate 41.

The lower holding part 50 includes a lower holding wait 51, a back surface support wall 52, and a pair of right and left holding hooks 53. In the display mounting stand 20 in the stand-up posture, the lower holding wall 51 supports a lower edge of the display, the back surface support wall 52 supports a back surface of the display, and the pair of holding hooks 53 prevents the lower edge of the display from coming off from the lower holding wall 51.

In the display mounting stand 20 in the stand-up posture, the lower holding wall 51 is located on the closing wall 31, and includes a cut-out 54. An outer shape of the cut-out 54 coincides with the cut-out 33 of the closing wall 31 when seen in the up-down direction. These cut-outs 33, 54 open in a direction where the display mounting stand 20 is pulled out (front surface direction). The back surface support wall 52 upwardly projects from an end on the back surface side of the lower holding wall 51. The pair of holding hooks 53 upwardly projects from an end on the front side of the lower holding wall 51. The pair of right and left holding hooks 53 has the opening of the cut-out 54 interposed therebetween. That is, the pair of holding hooks 53 is arranged respectively on the right side and the left side with the opening of the cut-out 54 interposed therebetween. When the display mounting stand 20 in the laid-down posture passes through the pull-out port 11H, the projection 12 of the aperture 11 passes through the cut-outs 33, 54.

The upper holding part 60 includes an upper holding wall 61 and a pair of right and left holding hooks 63. In the display mounting stand 20 in the stand-up posture, the upper holding wall 61 supports an upper edge of the display, and the pair of holding hooks 63 suppresses the upper edge of the display from coming off from the upper holding wall 61.

The upper holding wall 61 is coupled to the back surface wall 34 so as to be displaceable in the up-down direction. The upper holding wall 61 includes a cut-out 64. In the display mounting stand 20 in the stand-up posture, an outer shape of the cut-out 64 coincides with the cut-outs 33, 54 when seen in the up-down direction. The cut-out 64 opens in the direction where the display mounting stand 20 is pulled out (more frontward than the aperture 11). The pair of holding hooks 63 downwardly projects from the end on the front surface side of the upper holding wall 61. The pair of right and left holding hooks 63 has the opening of the cut-out 64 interposed therebetween. When the display mounting stand 20 in the laid-down posture passes through the pull-out port 11H, the projection 12 of the aperture 11 passes through the cut-out 64.

As shown in FIG. 3, while the display 70 is held in the display holder, the translation base 40 is pushed into the accommodating part 10 (from the state shown in FIG. 2) with the display mounting stand 20 maintained in the stand-up posture. Next, the upper holding pan 60 of the display mounting stand 20 is once pulled up, and the display 70 is then placed between the lower holding part 50 and the upper holding part 60. Subsequently, the upper holding part 60 is moved downward so as to abut to an upper edge of the display 70.

At this time, the cut-outs 33, 54 face the center of a lower edge of the display 70. The cut-out 64 faces the center of the upper edge of the display 70. The display mounting stand 20 enables a connection via a cable 71 between the display 70 and the external power source through the cut-outs 33, 54.

Figure 4:
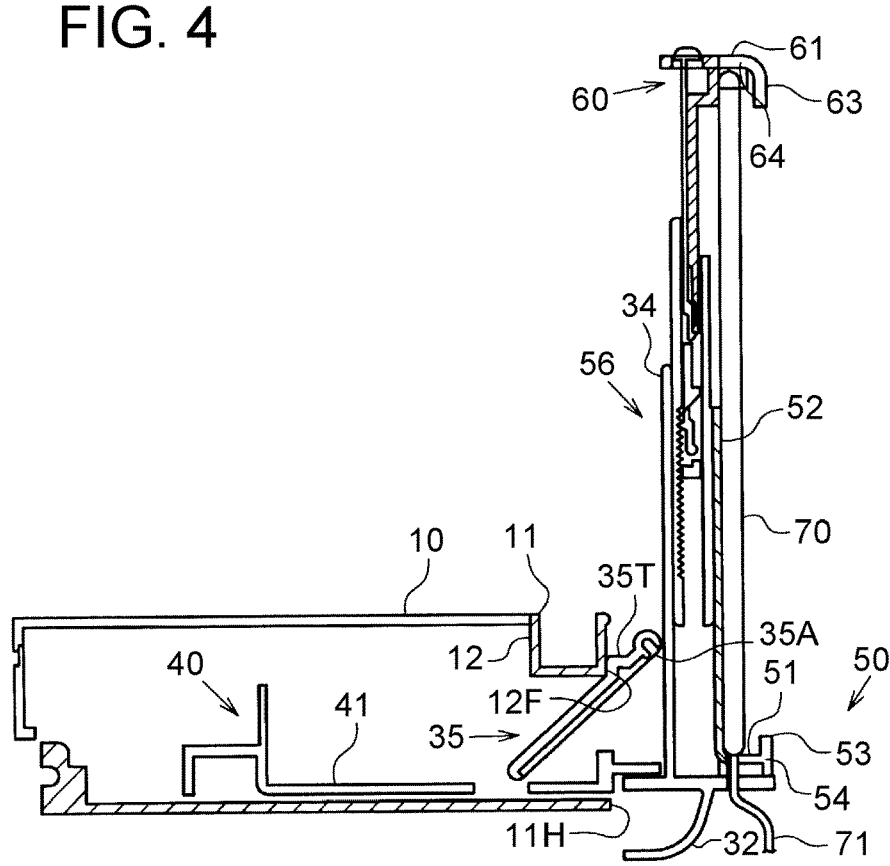
FIG. 4 is a view showing a side structure of the display mounting stand in a state of holding the display.

As shown in FIG. 4, the display mounting stand 20 includes a lock mechanism 56 thereinside. The lock mechanism 56 locks the position of the upper holding part 60 in the up-down direction relative to the back surface wall 34. The lock mechanism 56 releases the lock on the upper holding part 60 relative to the back surface wall 34 through operation on an operation knob. That is, the lock mechanism 56 enables downward movement of the upper holding part 60 such that the upper holding part 60 abuts to the upper edge of the display 70. In addition, the lock mechanism 56 enables the upper holding part 60 to be positioned at a position where the upper holding part 60 abuts to the upper edge of the display 70.

The display mounting stand 20 includes a support part 35. The support part 35 is rotatably connected to the back surface of the back surface wall 34 via a rotating shaft 35A extending in the right-left direction. When the display mounting stand 20 is in the laid-down posture, the support part 35 is in a posture along the back surface of the back surface wall 34. When the display mounting stand 20 is in the stand-up posture, the support part 35 is in a posture where a lower end of the support part 35 is in contact with the upper surface of the translation plate 41 and is inclined relative to the back surface of the back surface wall 34.

The support part 35 includes an abutting portion 35T. The abutting portion 35T is a projection projecting toward the aperture 11. When the display mounting stand 20 in the stand-up posture is pushed into the aperture 11, the abutting portion 35T abuts to the projection 12 of the aperture 11. The abutting portion 35T abuts to a front surface 12F of the projection 12 so as to restrict rotation of the support part 35. That is, the abutting portion 35T defines a distance of the display mounting stand 20 in the stand-up posture to be pushed into the aperture 11. In addition, in a state in which the display mounting stand 20 in the stand-up posture is pushed into the aperture 11, the abutting portion 35T supports the display mounting stand 20 in the stand-up posture. The abutting portion 35T has a triangular shape when seen in the right-left direction, and in the state in which the display mounting stand 20 in the stand-up posture is pushed into the aperture 11, the abutting portion 35T has a back surface that follows the front surface of the projection 12. The abutting portion 35T comes into surface contact with the projection 12 in the state in which the abutting portion 35T abuts to the projection 12.

As aforementioned, according to the above embodiment, the following effects can be obtained.

1) In the display mounting stand 20 in the stand-up posture, the cut-out 33 of the operating part 30 and the cut-out 54 of the lower holding part 50 face the center of the lower edge of the display 70. Hence, the display mounting stand 20 enables the connection via the cable 71 between the display 70 and the external power source through these cut-outs 33, 54. As a result, it is possible to supply electric power from the external power source to the display 70 in a held state.

2) When the display mounting stand 20 is accommodated in the accommodating part 10, the aperture 11 of the accommodating part 10 is filled with the operating part 30. The cut-out 33 of the operating part 30 is filled with the projection 12 of the aperture 11. Accordingly, when the display mounting stand 20 is accommodated in the accommodating part 10, it is possible to avoid that the aperture 11 is kept opened.

3) Since the display mounting stand 20 in the stand-up posture is supported by the support part 35, stability of the stand-up posture can be enhanced.

4) The posture of the support part 35 when the support part 35 supports the display mounting stand 20 is secured by abutment between the projection 12 of the aperture 11 and the abutting portion 35T of the support part 35. At this time, the abutment between the support part 35 and the projection 12 is implemented with a surface contact. Hence, even when the abutment between the support part 35 and the projection 12 is repetitively made several times, contact marks can be suppressed from remaining on the front surface 12F of the projection 12. In the display holder having the projection 12 that can be visually recognized, the design property of the display holder can be preserved.

5) The cut-outs 33, 54 open in the direction where the display mounting stand 20 is pulled out. Accordingly, when the user connects the cable to the display 70, workability for the user can be enhanced.

6) Gaps between the pair of holding hooks 53 having the cut-outs 33, 54 interposed therebetween open toward the user. As a result, workability for the user can further be enhanced, and stability of the posture of the display 70 in the held state can also be enhanced.

7) In the state in which the display mounting stand 20 is accommodated in the accommodating part 10, the outer shape of the cut-out 33 and the outer shape of the projection 12 coincide with each other when seen from the front. Hence, in the display holder having the projection 12 that can be visually recognized, the design property of the display holder can further be enhanced.

The above-described embodiment can also be implemented by being modified as follow. The outer shape of the projection 12 may be a shape having a sufficient gap between the projection 12 and the cut-out 33 in the state in which the display mounting stand 20 is accommodated in the accommodating part 10, or may be any shape that at least partially fills the cut-out 33. According to the configuration having a sufficient gap between the projection 12 and the cut-out 33, when the display mounting stand 20 is pulled out, a contact between the display mounting stand 20 and the aperture 11 can be suppressed. This means that it is possible to smoothly carry out the pull-out operation of the display mounting stand 20.

The holding hooks 53 may be omitted from the lower holding part 50. The number of the holding hooks 53 included in the lower holding part 50 may be three or more. In the display mounting stand 20 in the stand-up posture, the holding hooks 53 may be located above the opening of the cut-out 54. With the configuration in which the holding hooks 53 are located above the opening of the cut-out 54, it is possible to cover the connection pan between the display 70 and the cable by the holding hooks 53.

In the display mounting stand 20 in the stand-up posture, the cut-outs 33, 54 may open toward the aperture 11 side (in the back surface direction) rather than the display mounting stand 20. The turning direction of the display mounting stand 20, when being displaced from the laid-down posture to the stand-up posture, may be set to an opposite direction (downward direction on the front side of the drawing) to the direction indicated by an arrow shown in FIG. 2.

The configuration of supporting the display mounting stand 20 in the stand-up posture is not limited to the above-described case of using the above-described support part 35, but this supporting may be implemented by abutment between the back surface of the display mounting stand 20 and the aperture 11 by the push-in of the translation plate 41, for example. In this case, taking account of preserving the design property of the aperture 11, the back surface of the display mounting stand 20 can be provided with a buffer function using a buffer material or the like.

The abutment between the projection 12 and the abutting portion 35T may be changed to a point contact or a line contact. In this case, taking account of preserving the design property of the projection 12, the surface of the abutting portion 35T may be provided with a buffer function using a buffer material or the like.

What is claimed is:

1. A display holder comprising a display mounting stand configured to be accommodatable in an accommodating part located to an instrument panel of a vehicle,
    the display mounting stand configured to be accommodated in a laid-down posture in the accommodating part, be pulled out from the accommodating part, and hold a display in a stand-up posture,
    the display mounting stand including a pair of holding parts configured to hold the display in the stand-up posture between the pair of holding parts, the pair of holding parts being a pair of upper and lower holding parts,
    each of the pair of holding parts having a cut-out in a portion of the holding part, the portion of the holding part facing an edge of the display,
    the accommodating part including an aperture through which the display mounting stand in the laid-down posture passes, and the aperture being filled with one holding part of the pair of holding parts when the display mounting stand is accommodated in the accommodating part,
    a portion of the accommodating part including a projection projecting inward of the aperture, the portion of the accommodating part defining the aperture, the projection located at a position through which the cut-outs pass while the display mounting stand is in the laid-down posture, and
    the projection having a shape filling the cut-out of the one holding part when the display mounting stand is accommodated in the accommodating part.

2. The display holder according to claim 1, further comprising a support part rotatably connected to a back surface of the display mounting stand,
    the back surface of the display mounting stand being a surface of the display mounting stand in the stand-up posture facing the aperture, wherein
    the support part is configured to be in a posture along the back surface when the display mounting stand is in the laid-down posture, and in a posture inclined relative to the back surface when the display mounting stand is in the stand-up posture,
    the support part includes an abutting portion brought to abut to the projection by push-in of the display mounting stand in the stand-up posture toward the aperture, and
    the abutting portion is configured to restrict rotation of the support part by abutment to the projection, and abut to the projection in a surface contact.

3. The display holder according to claim 1, wherein in the display mounting stand in the stand-up posture, the cut-outs open in a direction where the display mounting stand is pulled out.

4. The display holder according to claim 3, wherein
each of the pair of holding parts further includes a pair of
holding hooks configured to hold the display, the pair
of holding hooks being a pair of right and left holding
hooks, and
in the display mounting stand in the stand-up posture, the
pair of holding hooks extends in an up-down direction,
and is arranged on a right side and a left side of an
opening of the cut-out with the opening of the cut-out
interposed between the pair of holding hooks.

5. The display holder according to claim 1, wherein when
the display mounting stand is accommodated in the accommodating part, outer shapes of the cut-outs and an outer shape of the projection coincide with each other when seen from a direction opposite to the aperture.

\* \* \* \* \*

UNITED STATES PATENT AND TRADEMARK OFFICE
CERTIFICATE OF CORRECTION

PATENT NO. : 10,640,053 B2  
APPLICATION NO. : 16/262042  
DATED : May 5, 2020  
INVENTOR(S) : Takako Yamada et al.

Page 1 of 1

It is certified that error appears in the above-identified patent and that said Letters Patent is hereby corrected as shown below:

On the Title Page

Item (72), inventors, inventor 1, address, delete "Nagoya" and insert --Nagoya-shi Aichi-ken--, therefor.

Item (72), inventors, inventor 2, address, delete "Miyoshi" and insert --Miyoshi-shi Aichi-ken--, therefor.

Item (72), inventors, inventor 3, address, delete "Kariya" and insert --Kariya-shi Aichi-ken--, therefor.

Item (72), inventors, inventor 4, address, delete "Tajimi" and insert --Tajimi-shi Gifu-ken--, therefor.

Item (72), inventors, inventor 5, address, delete "Tajimi" and insert --Tajimi-shi Gifu-ken--, therefor.

In the Specification

Column 1, Line(s) 6, delete "this" and insert --This--, therefor.

Column 1, Line(s) 41, delete "slate" and insert --state--, therefor.

Column 3, Line(s) 39, delete "slate" and insert --state--, therefor.

Column 5, Line(s) 7, delete "wait" and insert --wall--, therefor.

Column 7, Line(s) 52, delete "pan" and insert --part--, therefor.

Signed and Sealed this  
Thirtieth Day of June, 2020

Andrei Iancu  
*Director of the United States Patent and Trademark Office*